United States Patent
Johnson

(10) Patent No.: US 11,642,965 B2
(45) Date of Patent: May 9, 2023

(54) SYSTEM AND METHOD OF POWERING AN EXTERNAL DEVICE WITH A VEHICULAR BATTERY SYSTEM

(71) Applicant: Keith Johnson, Kennedyville, MD (US)

(72) Inventor: Keith Johnson, Kennedyville, MD (US)

( * ) Notice: Subject to any disclaimer, the term of this patent is extended or adjusted under 35 U.S.C. 154(b) by 0 days.

(21) Appl. No.: 17/488,222

(22) Filed: Sep. 28, 2021

(65) Prior Publication Data

US 2022/0016982 A1 Jan. 20, 2022

Related U.S. Application Data

(63) Continuation-in-part of application No. 16/600,425, filed on Oct. 11, 2019, now Pat. No. 11,130,405.

(60) Provisional application No. 62/744,542, filed on Oct. 11, 2018.

(51) Int. Cl.

| | |
|---|---|
| *B60L 1/00* | (2006.01) |
| *B60L 50/64* | (2019.01) |
| *B60L 58/20* | (2019.01) |
| *H02J 7/00* | (2006.01) |
| *B60L 50/60* | (2019.01) |

(52) U.S. Cl.
CPC ............... *B60L 1/00* (2013.01); *B60L 50/64* (2019.02); *B60L 50/66* (2019.02); *B60L 58/20* (2019.02); *H02J 7/0063* (2013.01); *H02J 2310/48* (2020.01)

(58) Field of Classification Search
CPC .. B60L 1/00; B60L 50/64; B60L 50/66; B60L 58/20; B60L 1/006; H02J 7/0063; H02J 2310/48; H02J 7/00309; H02J 7/342

USPC ......................................................... 307/9.1
See application file for complete search history.

(56) References Cited

U.S. PATENT DOCUMENTS

| | | |
|---|---|---|
| 6,002,221 A | 12/1999 | Ochiai |
| 6,450,974 B1 | 9/2002 | Kim |
| 6,724,100 B1 | 4/2004 | Gabriel |
| 7,629,772 B2 | 12/2009 | Eberhard |
| 9,190,831 B2 | 11/2015 | Mitsutani |
| 9,741,224 B1 * | 8/2017 | Singh .................... H04B 1/3816 |
| 11,130,405 B2 * | 9/2021 | Johnson ................ H02J 7/0063 |

(Continued)

FOREIGN PATENT DOCUMENTS

| | | |
|---|---|---|
| EP | 2056180 A1 | 5/2009 |
| WO | WO2008098230 A1 | 8/2008 |

*Primary Examiner* — Richard Tan

(57) ABSTRACT

A system and a method of powering an external device with a vehicular battery system allow a user to charge electrically-powered devices with the electrical power source of his or her vehicle. The system includes an electrically-driven vehicle which includes a high-voltage battery. The system further includes a power modifier, an auxiliary battery, at least one external device, at least one on/off relay, and a user controller. The power modifier modifies the high-voltage DC drawn from the high-voltage battery to safely charge the auxiliary battery. The auxiliary battery stores electrical power. The external device may be any electrically-powered device. The on/off relay allows a user to turn the system on or off when desired. The user controller is communicably coupled to the on/off relay through a relay wireless communication module. The user controller allows a user to remotely operate the on/off relay and, thus, remotely turn the system on or off.

13 Claims, 24 Drawing Sheets

(56) References Cited

U.S. PATENT DOCUMENTS

| | | |
|---|---|---|
| 2011/0043165 A1 | 2/2011 | Kinser |
| 2011/0187184 A1* | 8/2011 | Ichikawa ................ B60L 55/00 307/10.1 |
| 2012/0187759 A1* | 7/2012 | Kamichi ................. B60L 50/16 307/10.1 |
| 2013/0113413 A1 | 5/2013 | Harty |
| 2013/0234508 A1 | 9/2013 | Eisele |
| 2014/0002021 A1 | 1/2014 | Bertness |
| 2015/0061376 A1 | 3/2015 | Hartl |
| 2015/0085543 A1* | 3/2015 | Klesyk ................... H02M 7/48 363/97 |
| 2015/0375698 A1* | 12/2015 | Joao ..................... B60R 16/033 307/10.6 |
| 2018/0037121 A1 | 2/2018 | Narla |

* cited by examiner

SYSTEM AND METHOD OF POWERING AN EXTERNAL DEVICE WITH A VEHICULAR BATTERY SYSTEM

The current application is a continuation-in-part (CIP) application of a U.S. non-provisional application Ser. No. 16/600,425 filed on Oct. 11, 2019. The U.S. non-provisional application Ser. No. 16/600,425 claims a priority to the U.S. Provisional Patent application Ser. No. 62/744,542 filed on Oct. 11, 2018.

FIELD OF THE INVENTION

The present invention relates generally to a field of electric vehicles. More specifically, the present invention relates to methods and systems to transfer electrical energy generated or stored from an electrically-driven vehicle to an auxiliary battery with a vehicular battery system.

BACKGROUND OF THE INVENTION

A hybrid vehicle usually generates a significant amount of electrical energy while operating and/or moving on a highway. Even at a time of braking from a high speed, a significant amount of electrical energy may be generated by the hybrid vehicle that may charge a battery of the hybrid vehicle. The electrical energy generated may be stored in an external energy storing element such as a battery and may further be used to power other electrical appliances such as home appliances (ovens, fans, lights), office appliances (printers, computers, fans, lights) etc. An external battery, in an instance, may not be easily connected or disconnected with the electrically-driven vehicle without interfering with the vehicles electronic control unit (ECU) and affecting the operation and performance of the electrically-driven vehicle. Further, a performance of the external battery in older and/or conventional systems, in an instance, may not be monitored or controlled by a user seamlessly through a smartphone. Another problem is that standard hybrid vehicles, unlike plug-in hybrid vehicles, do not provide a means for external connections.

Therefore, there is a need for improved methods and systems to facilitate storing an electrical energy generated from an electrically-driven vehicle in an auxiliary battery with a vehicular battery system that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a block diagram representation of a system with an electrically-driven vehicle that may be connected to an electrically-powered device through a vehicular battery system is disclosed. The system, in an instance, may include, but not limited to, an electrically-driven vehicle, a high voltage battery, a quick disconnect, a fuse, a diode, an intelligent charge controller, a direct current (DC)—alternating current (AC) inverter.

According to some aspects, a block diagram representation of a system with an electrically-driven vehicle that may be connected to an electrically-powered device through a vehicular battery system is disclosed. The system, in an instance, may include, but not limited to, an electrically-driven vehicle, a high voltage battery, a low-voltage battery, a quick disconnect, a fuse, a diode, an intelligent charge controller, an auxiliary battery, a DC-AC inverter.

According to some aspects, a block diagram representation of a system of an electrically-driven vehicle with an onboard charging system is disclosed. The system, in an instance, may include, but not limited to, an electrically-driven vehicle, a high voltage battery, an ICE, an inverter generator, an intelligent charge controller, an auxiliary battery.

According to some aspects, a block diagram representation of a Off Grid Multi-Voltage Auxiliary Charging Power System is disclosed. The system, in an instance, may include, but not limited to, an electrically-driven vehicle, a high voltage battery, a quick disconnect, a fuse, a diode, an MPPT charge controller, and/or an auxiliary battery.

According to some aspects, a block diagram representation of an electrically-driven vehicle with a vehicular battery system is disclosed.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

DETAIL DESCRIPTIONS OF THE INVENTION

All illustrations of the drawings are for the purpose of describing selected versions of the present invention and are not intended to limit the scope of the present invention.

Figure 1A:
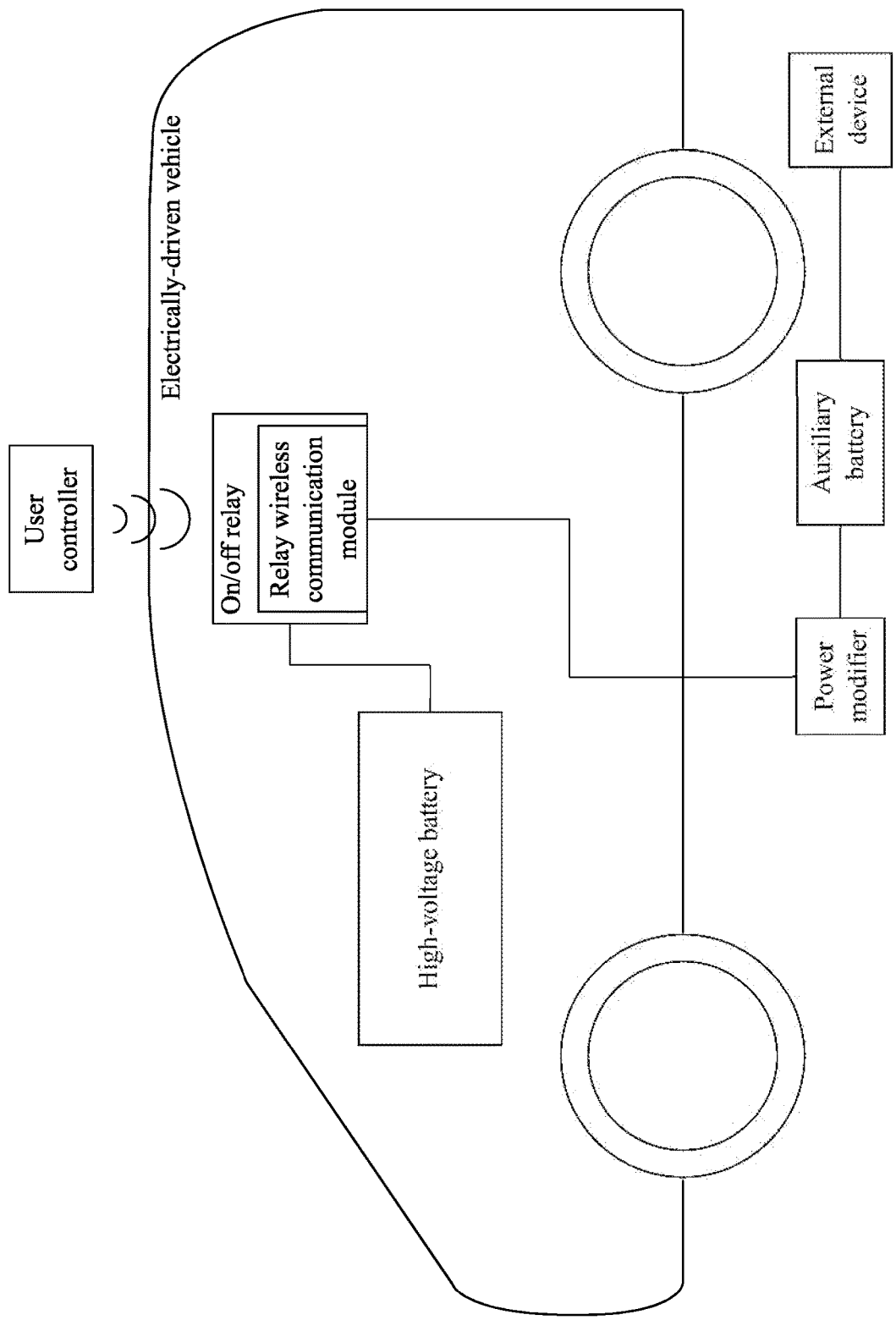
FIG. 1A is a schematic diagram illustrating the overall system of the present invention.

The present invention is a system and method of powering an external device with a vehicular battery system. The system allows a user to easily draw power from a vehicular battery system in order to power external electrical devices. The power is drawn in a unilateral direction eliminating the need to communicate with a vehicle's onboard electronic control unit (ECU). With reference to FIG. 1A, the system is provided with an electrically-driven vehicle (Step A). The electrically-driven vehicle may be a hybrid vehicle that generates its own electrical power with its hybrid internal combustion engine. Further, the electrically-driven vehicle may be a vehicle with a high-voltage battery source such as, but not limited to, a Tesla type vehicle. The electrically-driven vehicle comprises at least one high-voltage battery and a battery casing. The high-voltage battery is positioned within the battery casing. The high-voltage battery is said electrical power source of the electrically-driven vehicle. The battery casing is used to protect and conceal the high-voltage battery. In the preferred embodiment of the present invention, the system is used to draw direct current (DC) from the high-voltage battery. The system is provided with a power modifier, an auxiliary battery, at least one external device, at least one on/off relay, a relay wireless communication module, and a user controller (Step). The power modifier is a single device or a combination of devices which is used to modify the high-voltage DC drawn from the high-voltage battery in order for the auxiliary battery to be safely charged. The auxiliary battery is used to store power that is drawn from the high-voltage battery. The external device may be any electrically-powered device that is powered by the auxiliary battery. For example, the external device may be, but not is limited to, a home appliance or an office appliance. The on/off relay allows a user to turn the system on or off when desired. The user controller is communicably coupled to the on/off relay through the relay wireless communication module and an electrical connection is formed in series from the high-voltage battery, through the on/off relay, through the power modifier, and to the auxiliary battery. The user controller may be any device that can remotely control the on/off relay such as, but not limited to, a programmable logic controller (PLC), a computing device, or a handheld remote. The on/off relay is used to toggle the electrical connection between an open state and a closed state. The open state is the off state of the system, and the closed state is the on state of the system. The user controller provides a user the option to remotely operate the on/off relay and, thus, remotely toggle electrical connection between the open state and the closed state.

Figure 2:
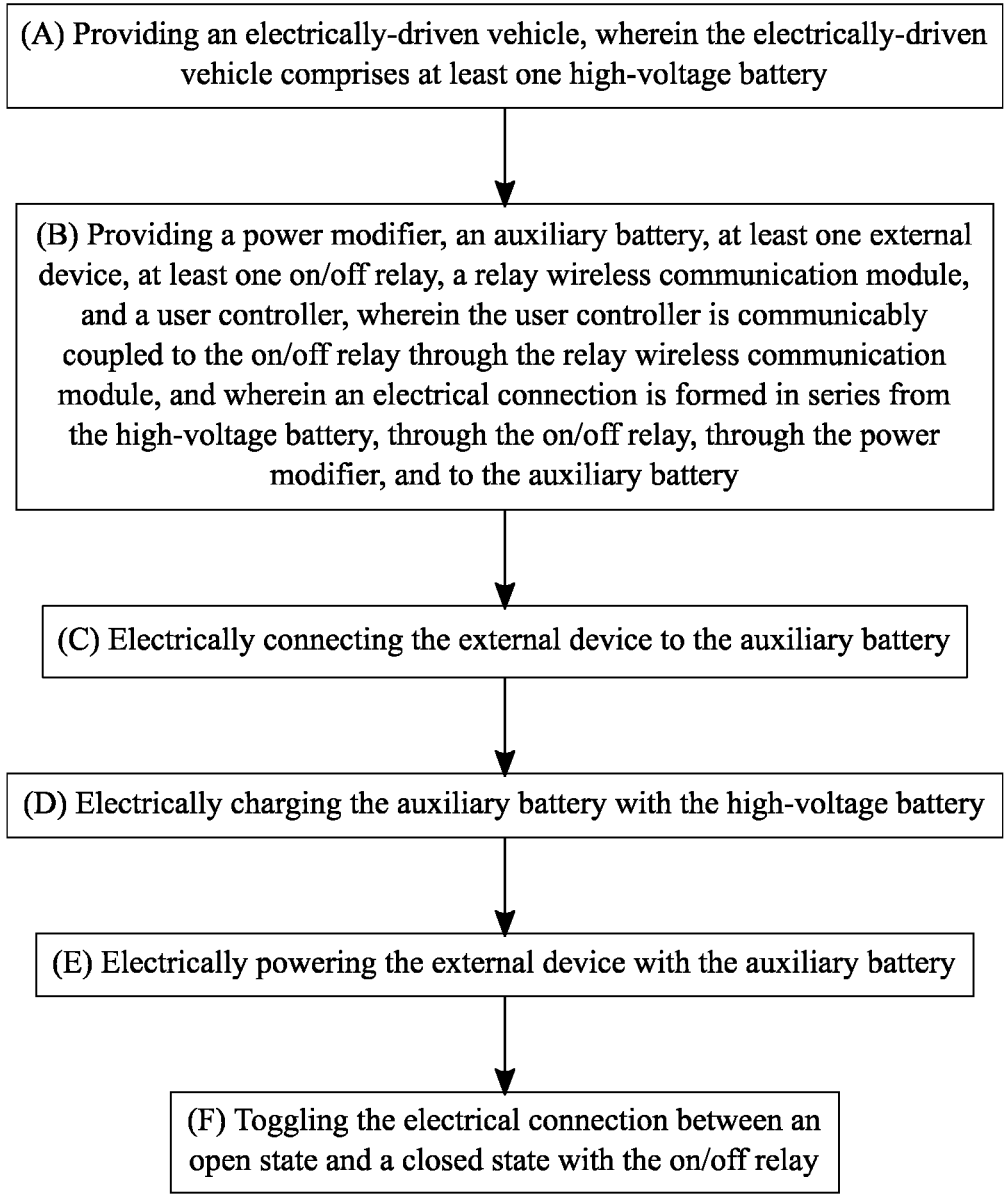
FIG. 2 is a flowchart illustrating the overall process for the method of the present invention.

With reference to FIG. 2, the method of the present invention follows an overall process in order to power the external device with a vehicular battery system. Firstly, the external device is electrically connected to the auxiliary battery (Step C). In further detail, a cable such as, but not limited to, a standard power cord or a USB power cable can be used to electrically connect the external device to the auxiliary battery. Thus, electrically energy can be transferred from the auxiliary battery to the external device. The high-voltage battery is used to electrically charge the auxiliary battery (Step D). Thus, the auxiliary battery can store electrical energy that is drawn from the high-voltage battery. The auxiliary battery is then used to electrically power the external device (Step E). Therefore, the external device is powered by the high-voltage battery through the auxiliary battery. Moreover, the on/off relay can be used to toggle the electrical connection between the open state and the closed state (Step F). In more detail, the user can remotely turn the system on or off when desired through the user controller and the on/off relay.

Figure 1B:
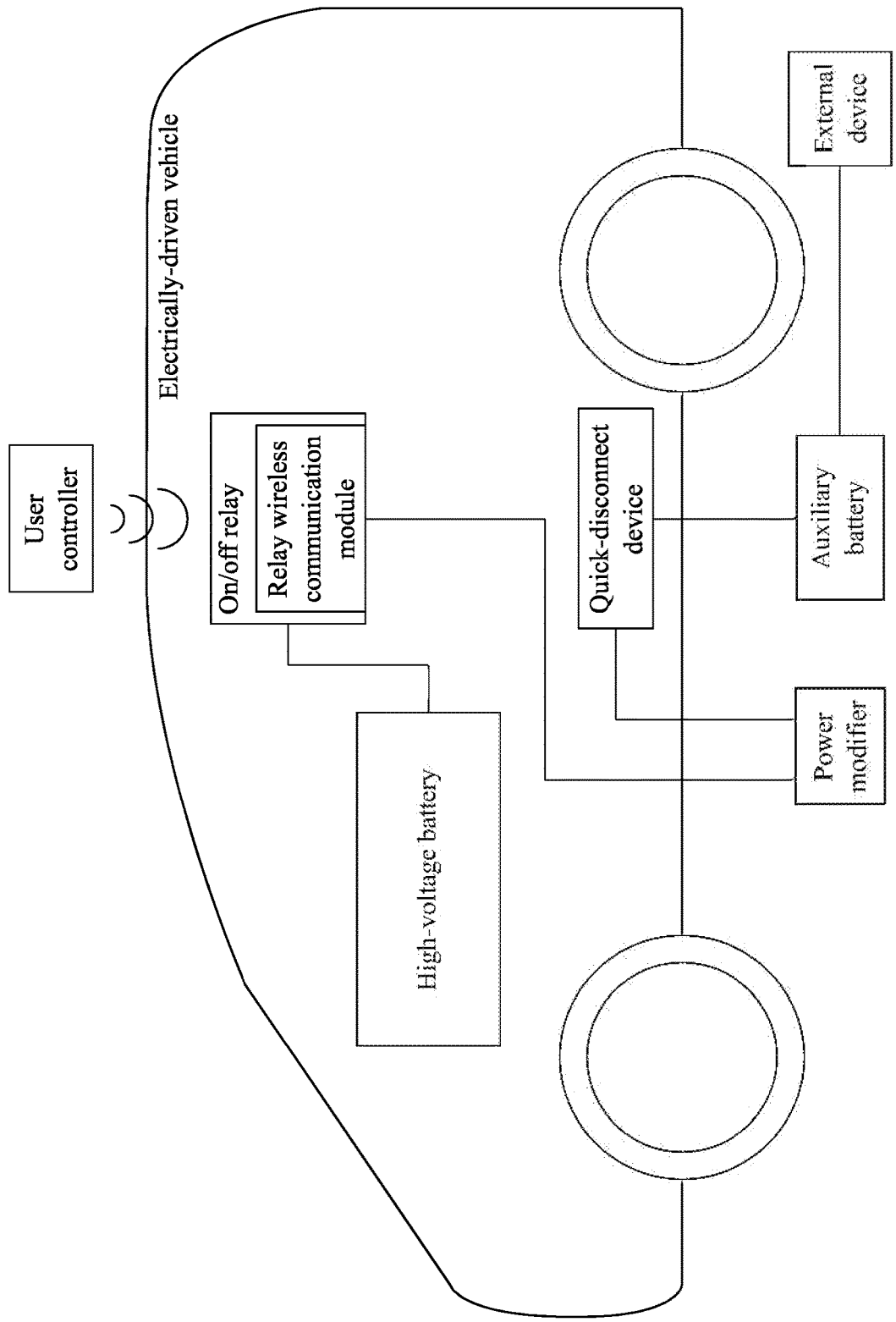
FIG. 1B is a schematic diagram illustrating the overall system of the present invention with the auxiliary battery being charged while the electrically-driven vehicle is in park and displaying the quick-disconnect device.
Figure 1C:
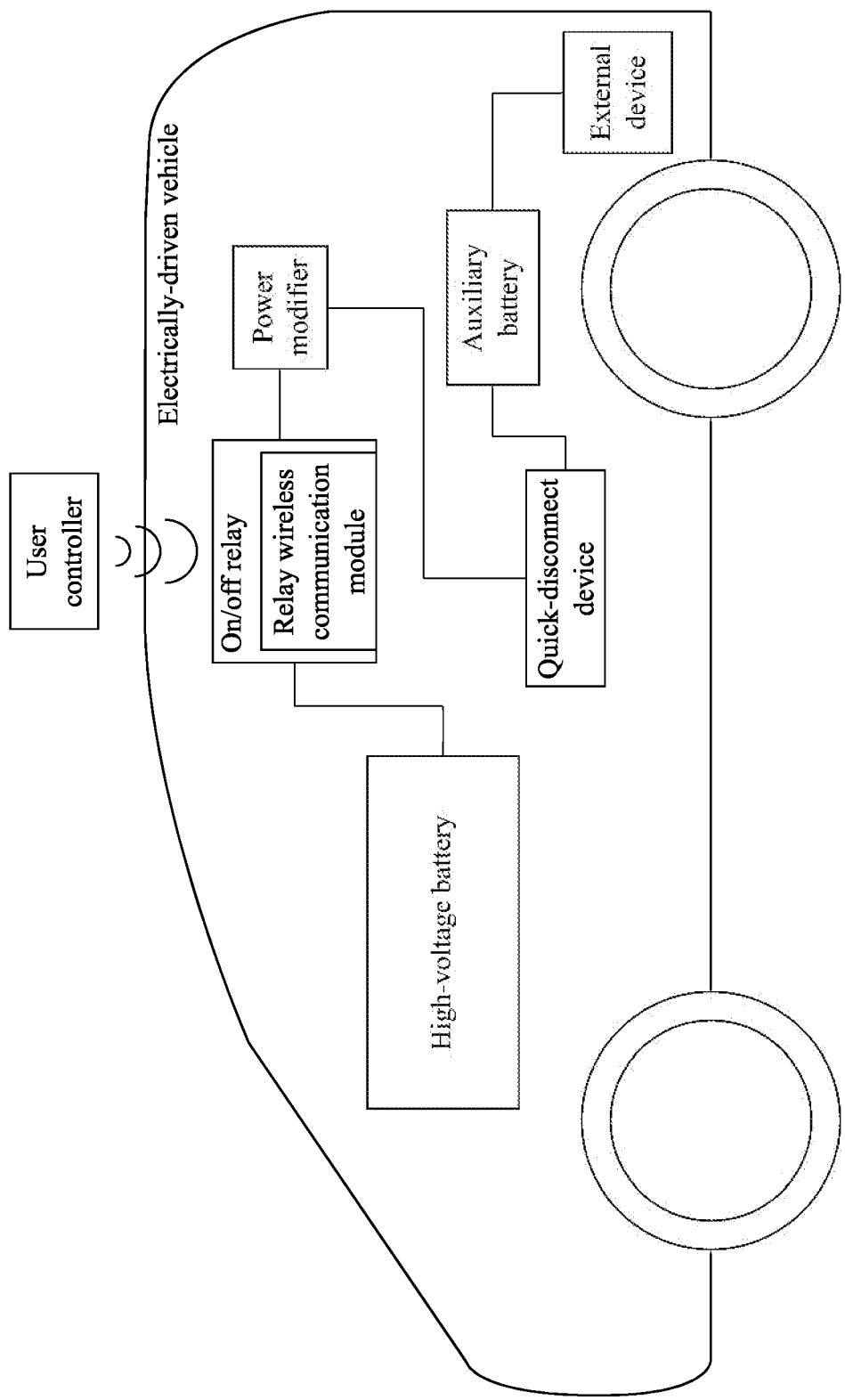
FIG. 1C is a schematic diagram illustrating the overall system of the present invention with the auxiliary battery being charged while the electrically-driven vehicle is in operation and displaying the quick-disconnect device.
Figure 3:
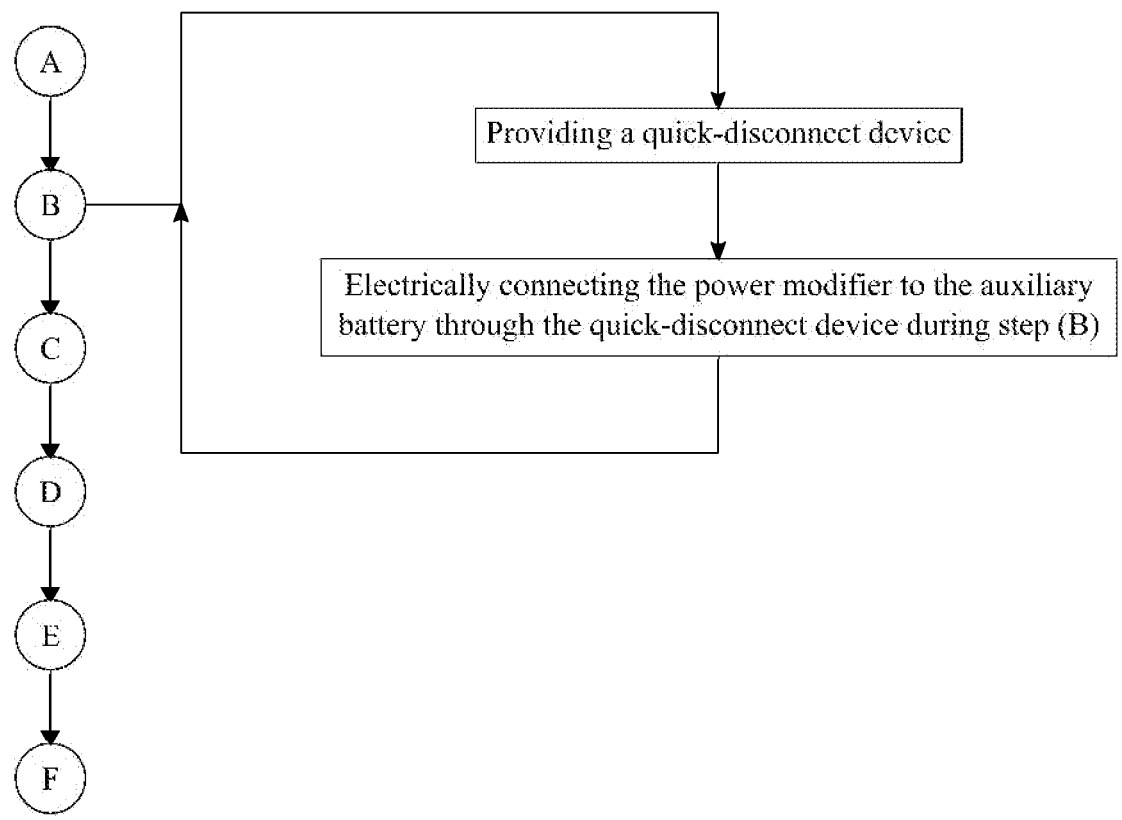
FIG. 3 is a flowchart illustrating the subprocess of connecting the auxiliary battery to the high-voltage battery through the quick-disconnect device.

In one embodiment of the present invention where a hybrid vehicle as the electrically-driven vehicle is in park and with reference to FIGS. 1B and 3, the auxiliary battery and the power modifier may be positioned external to the electrically-driven vehicle. The system may further be provided with a quick-disconnect device. The quick-disconnect device is used to establish a safe and efficient electrical connection between the high-voltage battery and the auxiliary battery. For example, the quick-disconnect device may be any electrical vehicle (EV) charging connector. Further, the quick-disconnect device allows a user to selectively connect or disconnect the auxiliary battery to and from the high-voltage battery when desired. The power modifier is electrically connected to the auxiliary battery through the quick-disconnect device during Step B. Thus, the high-voltage battery can charge the auxiliary battery when the electrically-driven vehicle is being operated. Alternatively, where the electrically-driven vehicle is in operation and with reference to FIG. 1C, the auxiliary battery, the power modifier, and the external device are positioned within the electrically-driven vehicle.

Figure 4:
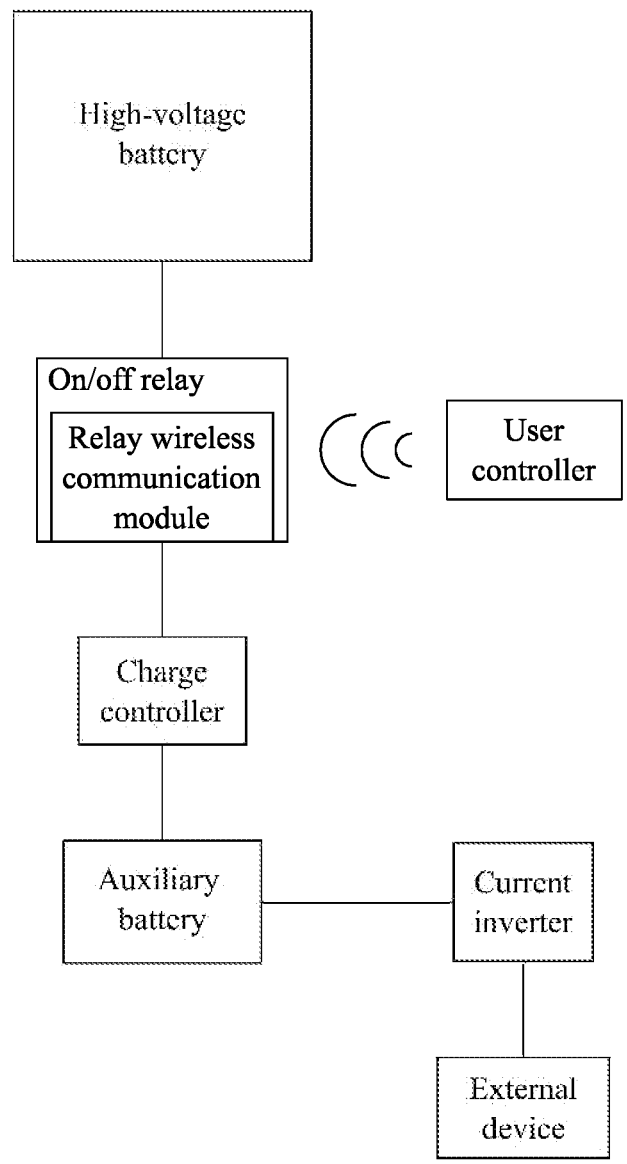
FIG. 4 is a block diagram illustrating an embodiment of the system with the charge controller as the power modifier and with the current inverter.
Figure 5:
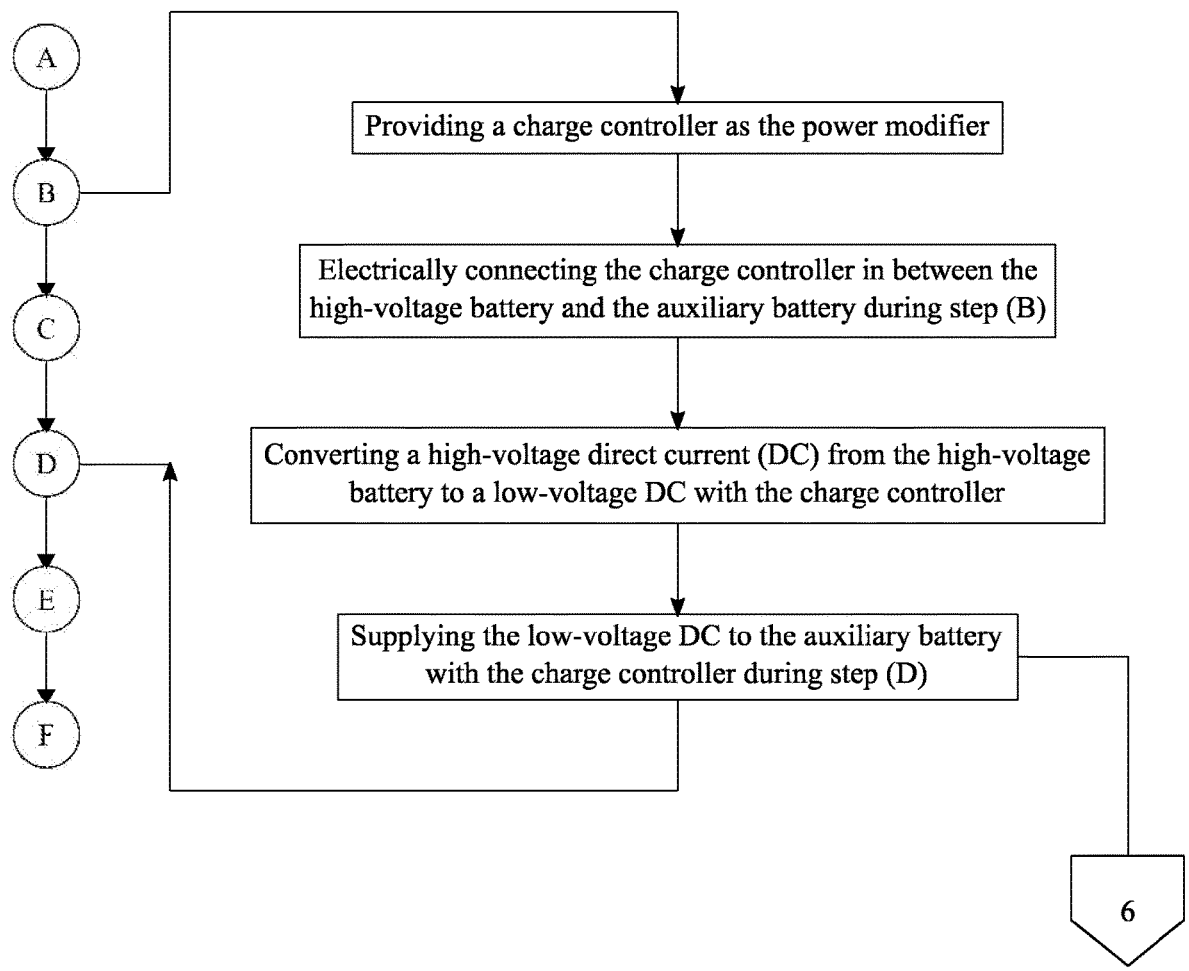
FIG. 5 is a flowchart illustrating the subprocess of charging the auxiliary battery using the charge controller as the power modifier.

With reference to FIGS. 4 and 5, the system is provided with the charge controller as the power modifier. The charge controller is preferably a much higher voltage charger. For example, the charge controller is preferably a 600-volt, 80-amp charger such as, but not limited to, a Morningstar Tristar MPPT 600V solar charge controller. Moreover, the charge controller is programmable for variable currents and battery systems. The charge controller is electrically connected in between the high-voltage battery and the auxiliary battery. This allows the charge controller to directly charge the auxiliary battery. The charge controller is used to supply a low-voltage DC to the auxiliary battery during Step F. Thus, the charge controller can efficiently and safely charge the auxiliary battery without the use of a power supply.

Figure 6:
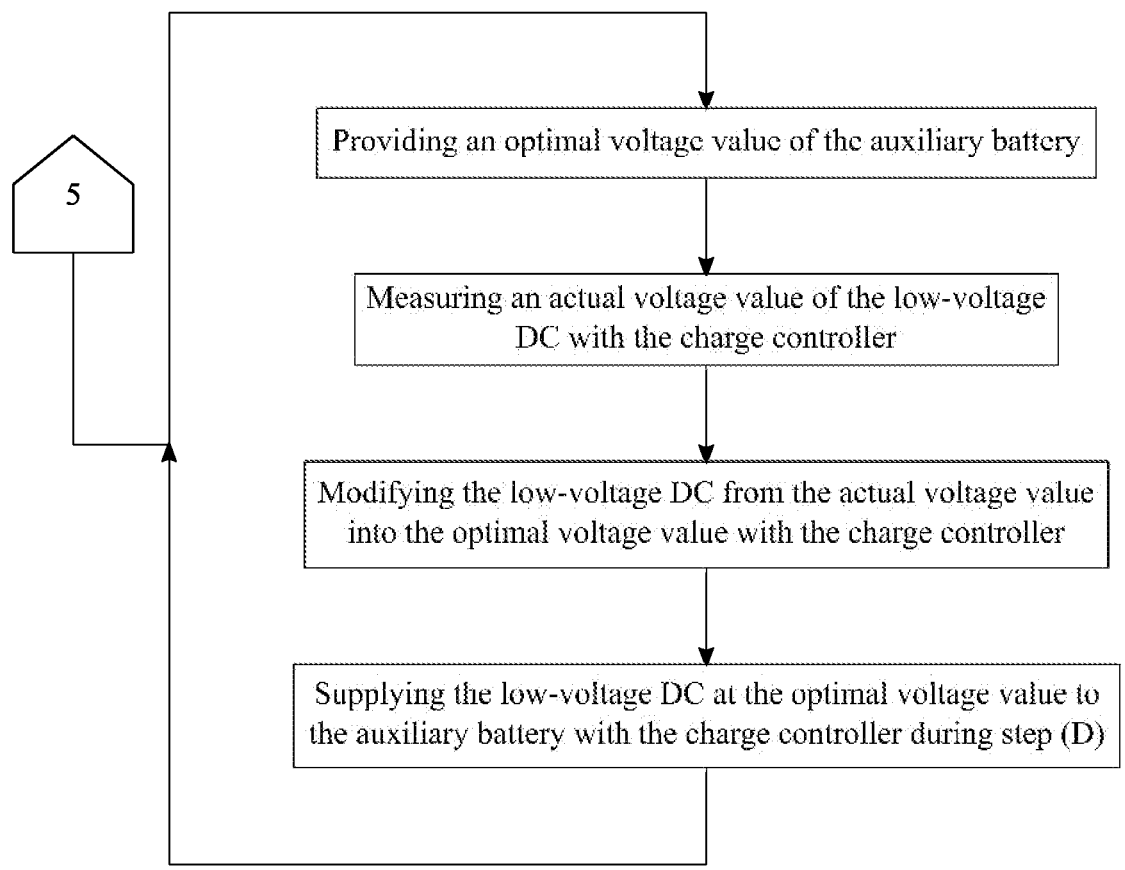
FIG. 6 is a flowchart illustrating the subprocess of charging the auxiliary battery at the optimal voltage value with the high-voltage battery.

With reference to FIG. 6, the system is provided with an optimal voltage value of the auxiliary battery. The optimal voltage value is the most efficient voltage that can be received by the auxiliary battery. The charge controller is used to measure an actual voltage value of the low-voltage DC. The actual voltage value is a raw voltage measurement of the low-voltage DC converted by the charge controller. The charge controller is used to modify the low-voltage DC from the actual voltage value into the optimal voltage value. This step ensures the low-voltage DC is safe to be received by the auxiliary battery. The charge controller is used to supply the low-voltage DC at the optimal voltage value to the auxiliary battery during Step D. Thus, the auxiliary battery is efficiently and safely charged by the high-voltage battery.

Figure 7:
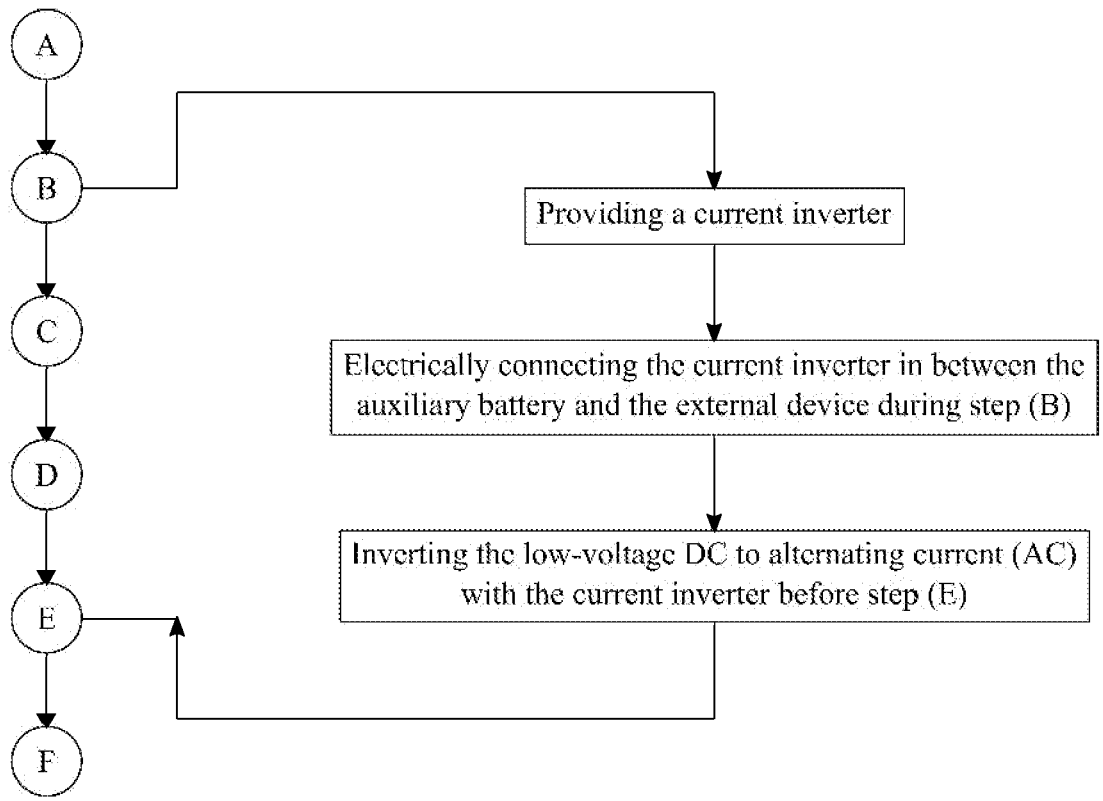
FIG. 7 is a flowchart illustrating the subprocess of inverting DC to AC with the current inverter.

With reference to FIGS. 4 and 7, the system is further provided with a current inverter. The current inverter may be any inverter device able to invert DC to AC or vise versa. The current inverter is electrically connected in between the auxiliary battery and the external device. This allows the current inverter to invert the DC stored by the auxiliary battery before the auxiliary low-voltage batter is used to power the external device. The current inverter is used to invert the low-voltage DC to alternating current (AC) during Step E. Thus, the external device can be efficiently and safely powered by the auxiliary battery.

Figure 8:
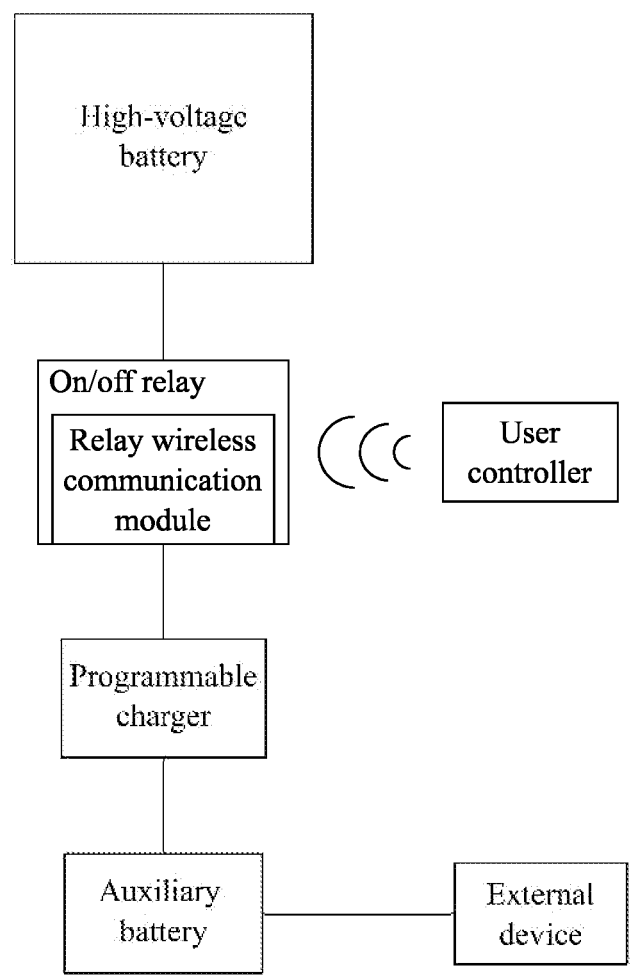
FIG. 8 is a block diagram illustrating another embodiment of the system with the programmable charger as the power modifier.
Figure 9:
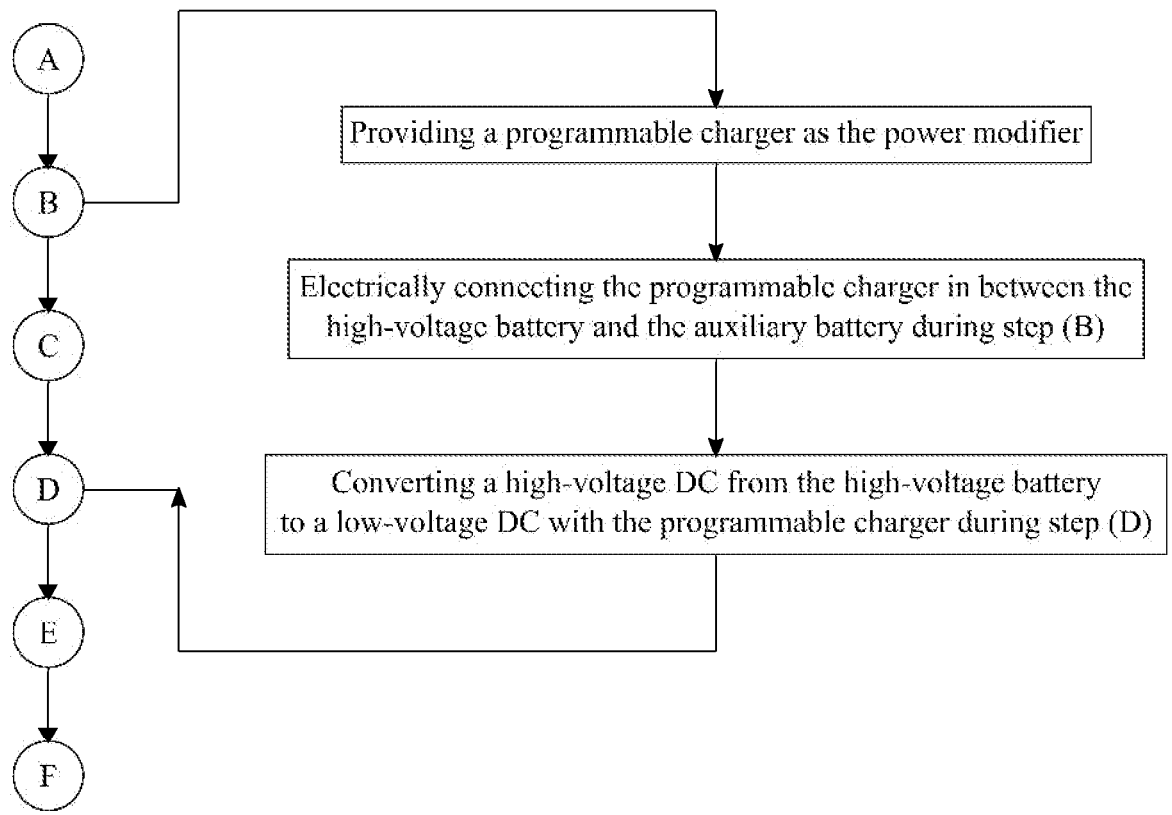
FIG. 9 is a flowchart illustrating the subprocess of charging the auxiliary battery using the programmable charger as the power modifier.

With reference to FIGS. 8 and 9, the system is provided with a programmable charger as the power modifier. The programmable charger is able to convert a high-voltage DC into a low-voltage DC. The programmable charger is used instead of the charge controller. Moreover, the programmable charger is a high-voltage input, low-voltage output charger such as, but not limited to, a DBU-3200-48 charger. Therefore, the programmable charger is programmable for various charge curves and can be used with various battery types. The programmable charger is electrically connected in between the high-voltage battery and the auxiliary battery. This allows the programmable charger to convert the DC drawn from the high-voltage battery before being used to charge the auxiliary battery. The programmable charger is used to convert a high-voltage DC from the high-voltage battery to a low-voltage DC during Step D. Thus, the DC from the high-voltage battery is safe for charging the auxiliary battery.

Figure 10:
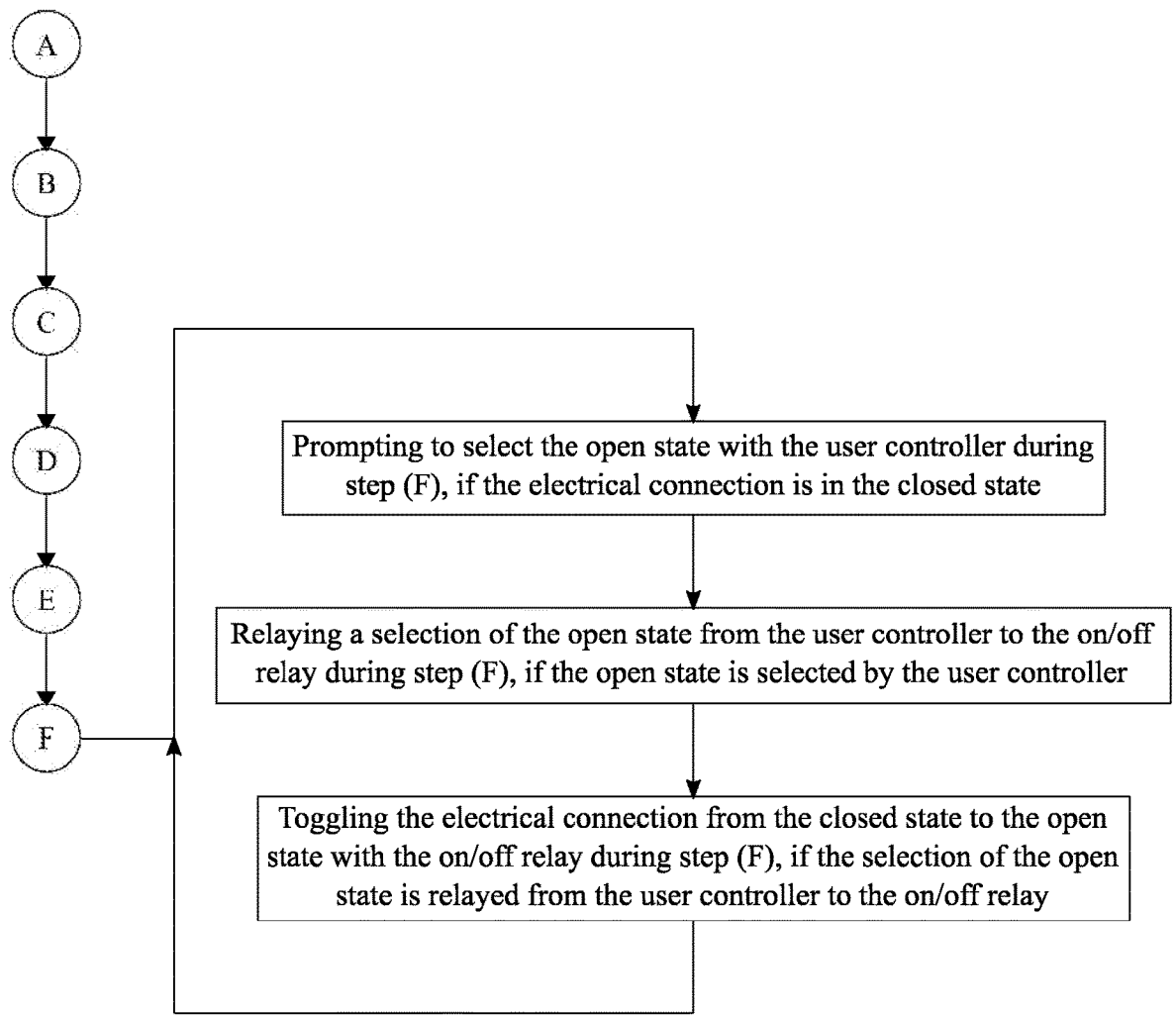
FIG. 10 is a flowchart illustrating the subprocess of using the user controller to remotely turn off the system.

With reference to FIG. 10, the user controller can prompt to select the open state during Step F, if the electrical connection from the high-voltage battery to the auxiliary low-voltage batter is in the closed state. In more detail, the user is provided the option to turn the system off through the user controller. The selection of the open state is relayed from the user controller to the on/off relay during Step F, if the open state is selected by the user controller. The on/off relay is then used to toggle the electrical connection from the from the closed state to the open state during Step F. Thus, the system is turned off by an input of a user through the user controller.

Figure 11:
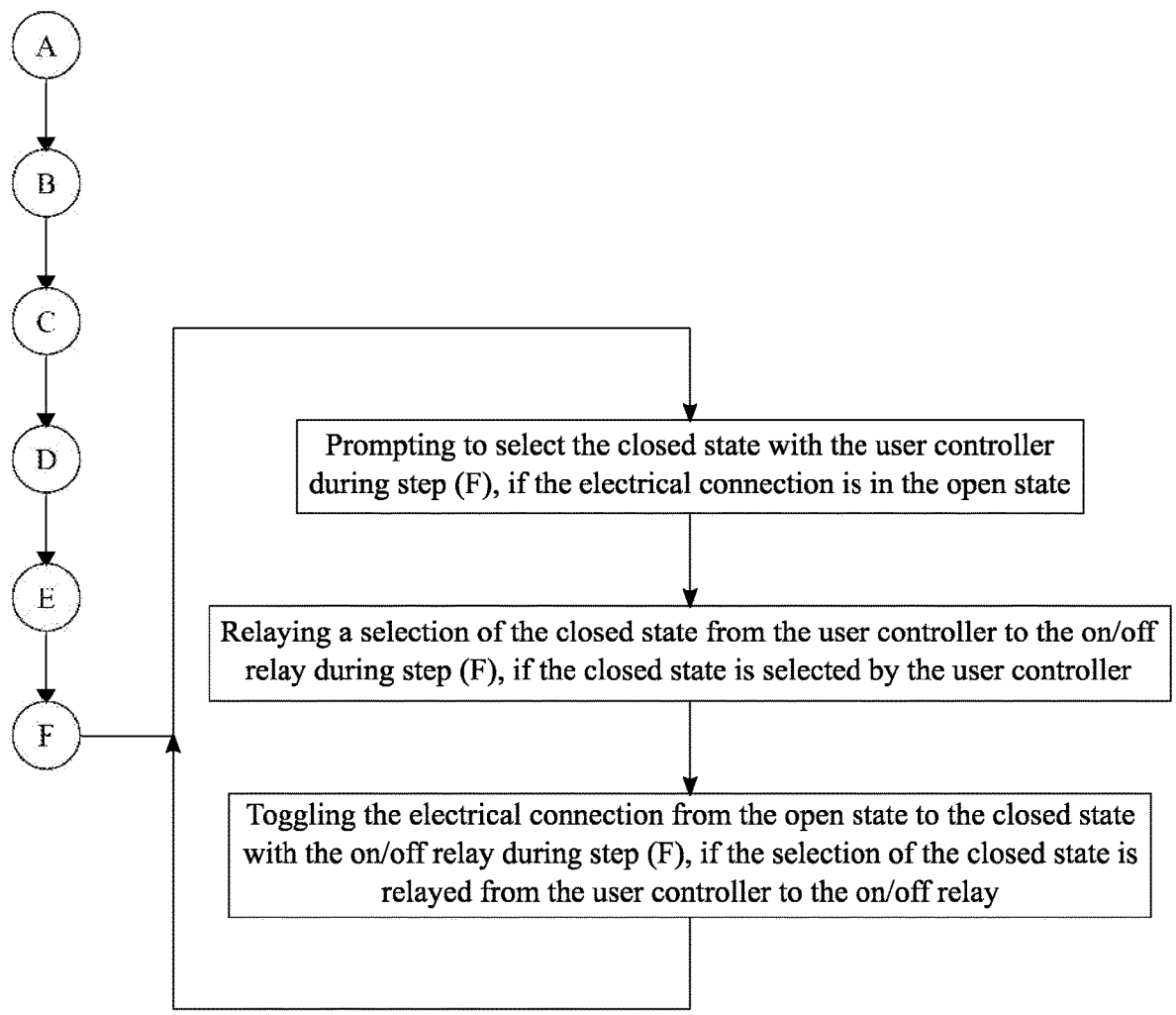
FIG. 11 is a flowchart illustrating the subprocess of using the user controller to remotely turn on the system.

Alternatively and with reference to FIG. 11, the user controller can prompt to select the closed state during Step F, if the electrical connection from the high-voltage battery to the auxiliary battery is in the open state. In more detail, the user is provided the option to turn the system on through the user controller. The selection of the closed state is relayed from the user controller to the on/off relay during Step F, if the closed state is selected by the user controller. The on/off relay is then used to toggle the electrical connection from the open state to the closed state during Step F. Thus, the system is turned on by an input of a user through the user controller.

Figure 12:
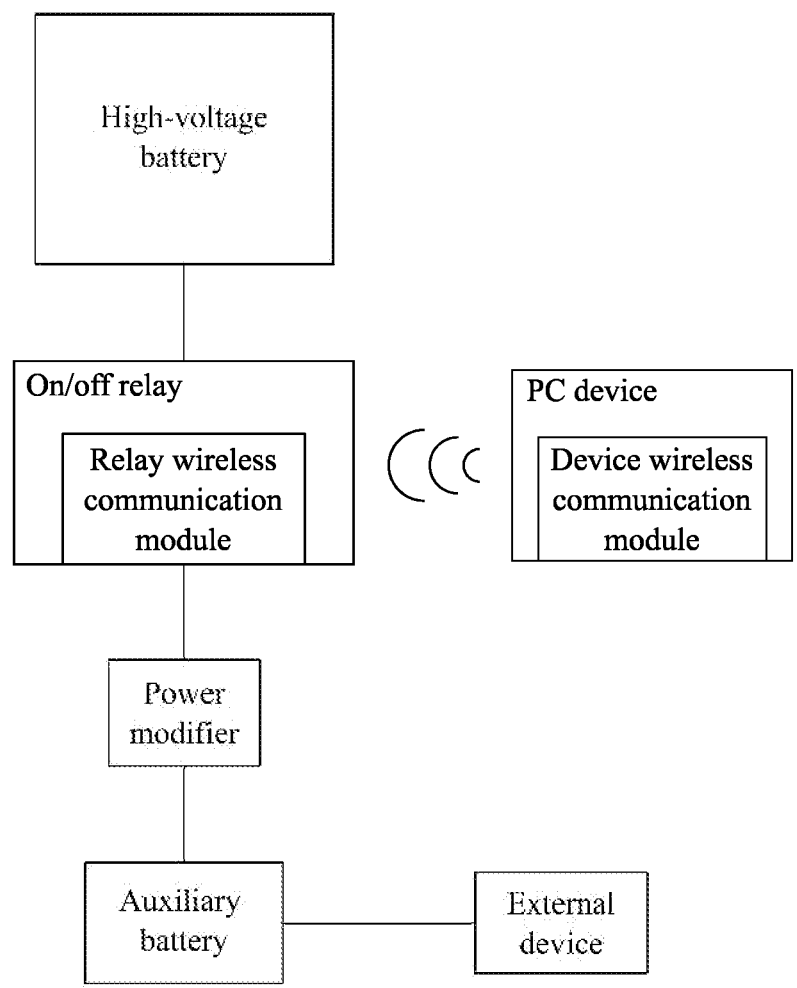
FIG. 12 is a block diagram illustrating another embodiment of the system with the PC device as the user controller.
Figure 13:
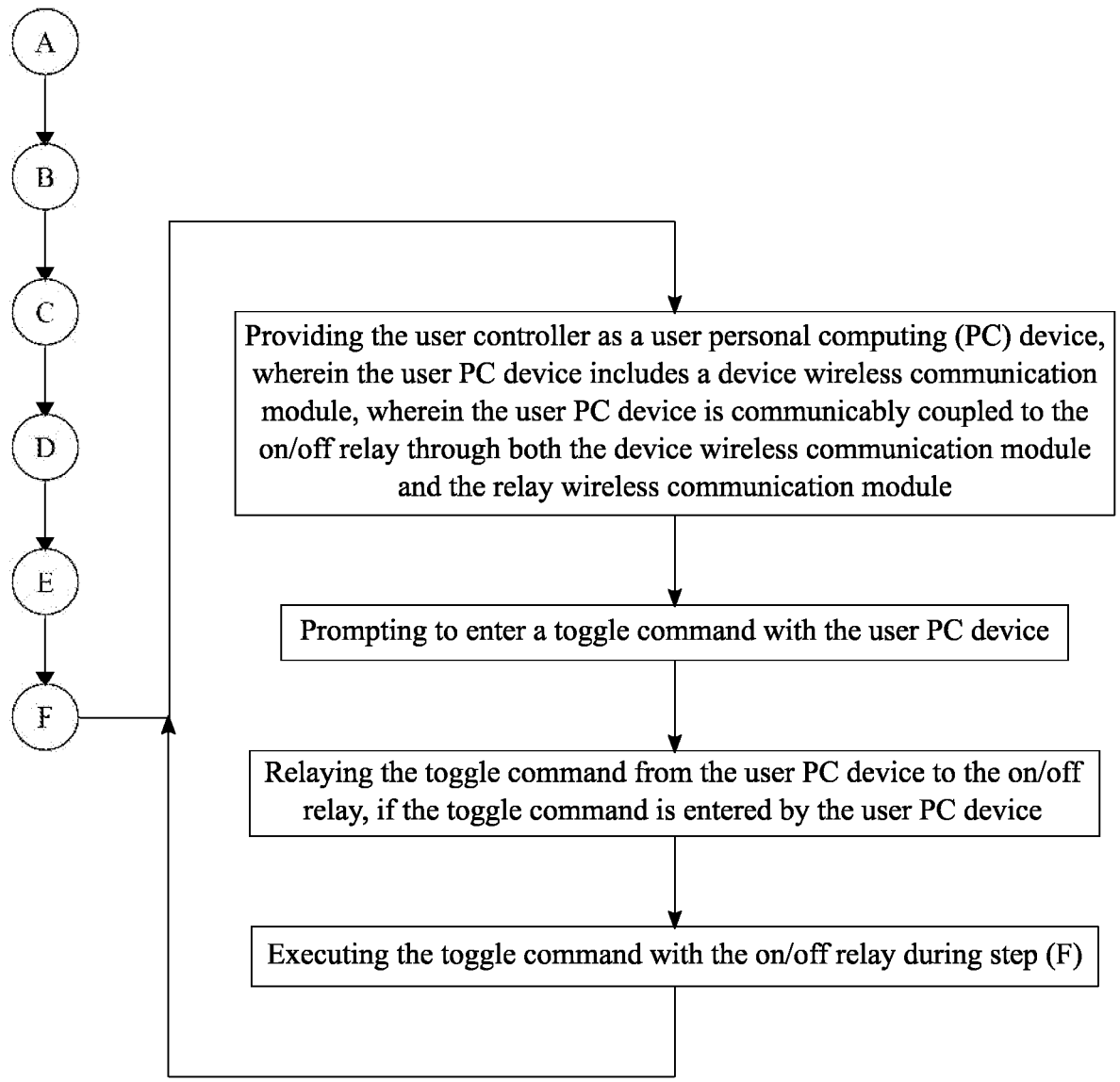
FIG. 13 is a flowchart illustrating the subprocess of using the PC device to remotely turn the system on or off.

With reference to FIGS. 12 and 13, the present invention may further provide a software application in order to remotely operate the on/off relay. In this case, the user controller is provided as a user personal computing (PC) device. The user PC device may be any type of computing device such as, but not limited to, a desktop computer, a notebook computer, smartphone, or mobile tablet. Preferably, the user PC device is a smartphone, or a mobile tablet. The user PC device includes a device wireless communication module. The user PC device is communicably coupled to the on/off relay through both the device wireless communication module and the relay wireless communication module. In more detail, through the software application, the user can wirelessly pair the user PC device to the on/off relay. The user PC device prompts to enter a toggle command. In more detail, the toggle command can be a command to turn the system on or off offered through the software application. The toggle command is relayed from the user PC device to the on/off relay if the toggle command is entered by the user PC device. The on/off relay then executes the toggle command during Step F. Thus, the user can remotely operate the on/off relay with a computing device through a software application of the present invention.

Figure 14:
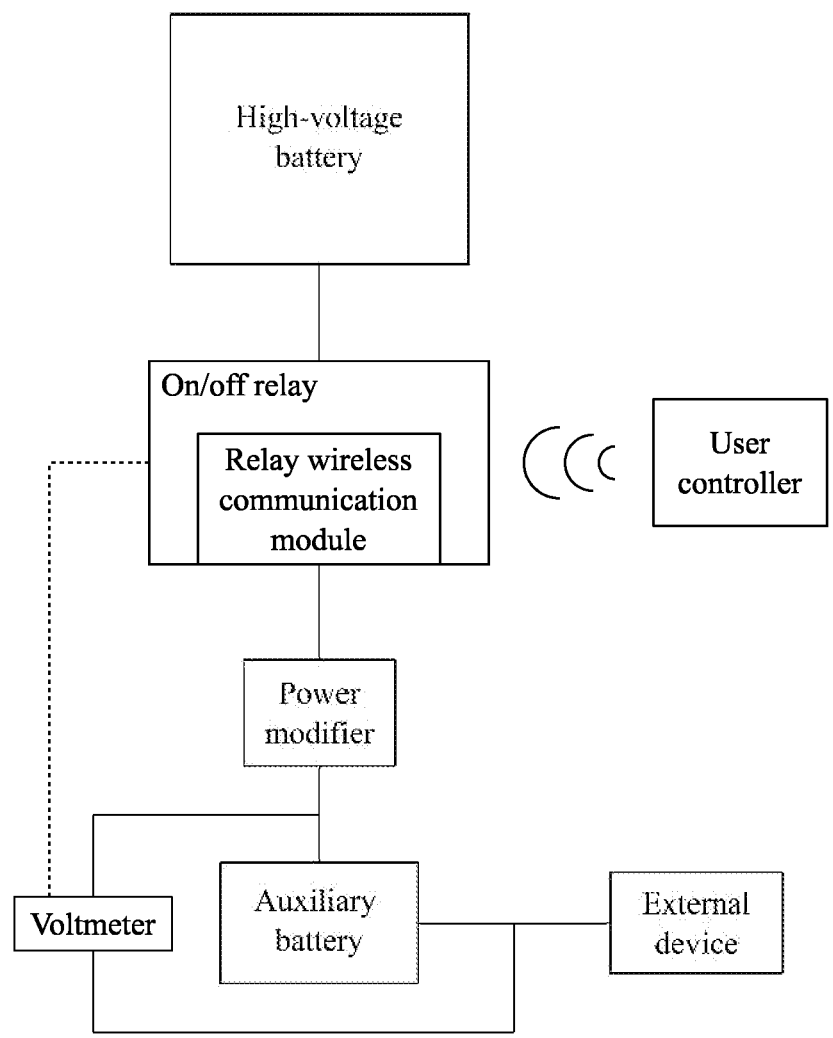
FIG. 14 is a block diagram illustrating another embodiment of the system with the voltmeter connected across the auxiliary battery and communicably coupled to the on/off relay.
Figure 15:
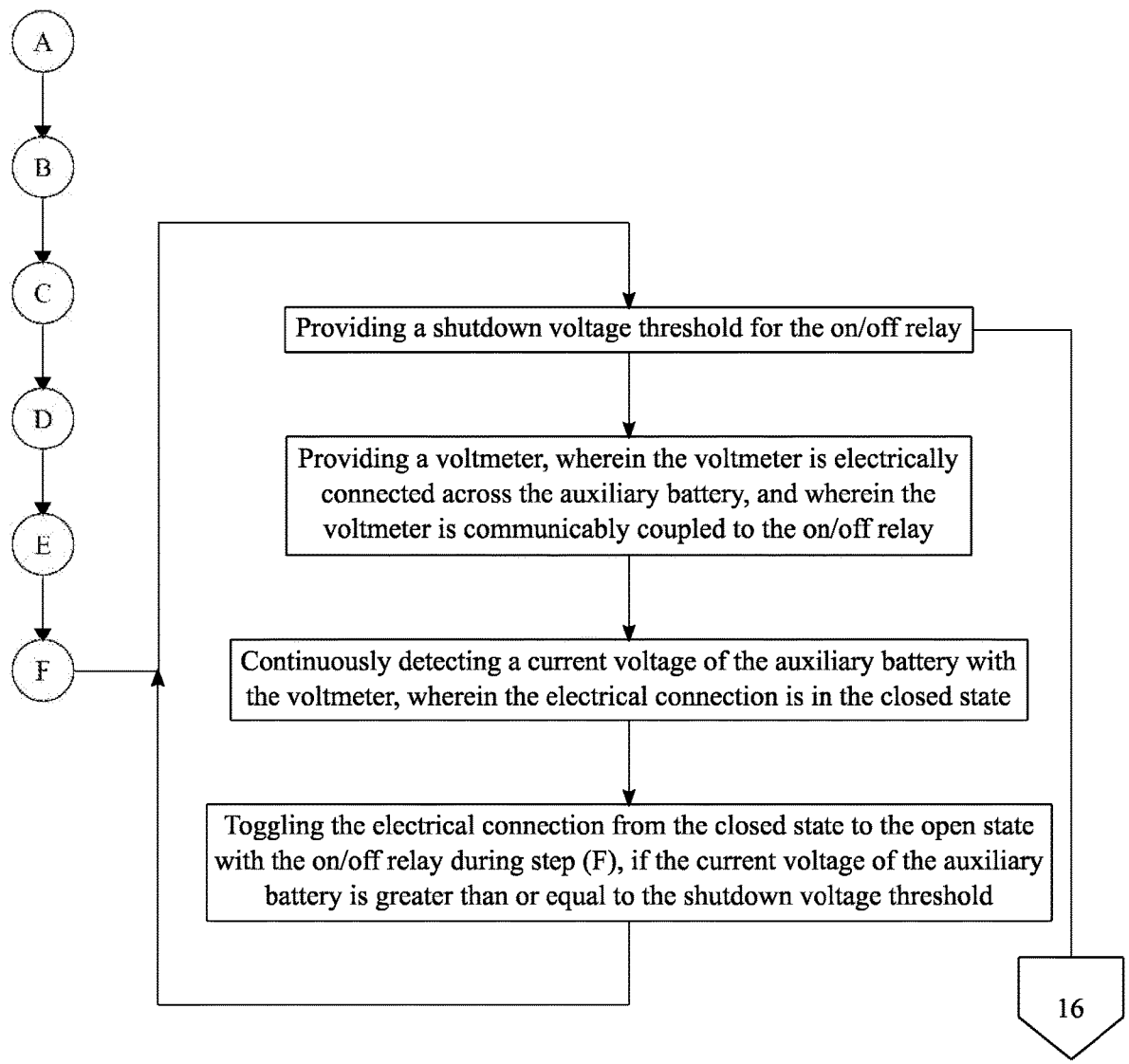
FIG. 15 is a flowchart illustrating the subprocess of using the voltmeter and the on/off relay to turn the system off when the auxiliary battery reaches a certain voltage.
Figure 16:
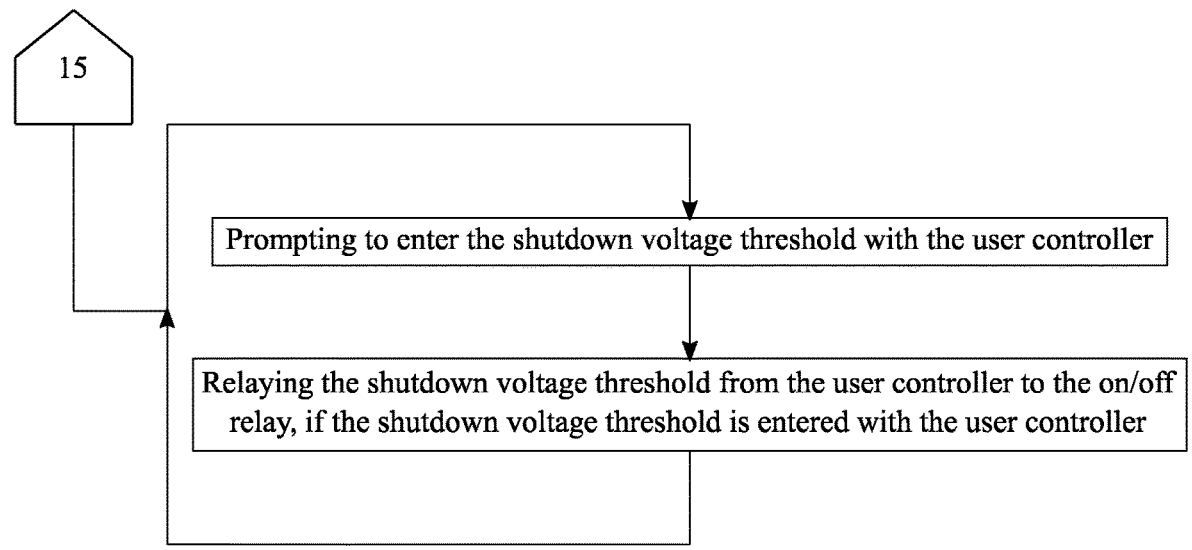
FIG. 16 is a flowchart illustrating the subprocess of manually inputting the shutdown voltage threshold with the user controller.

With reference to FIGS. 14 and 15, the system may be further provided with a voltmeter that is electrically connected across the auxiliary battery. Additionally, a shutdown voltage threshold is stored on the on/off relay and the voltmeter is communicably coupled to the on/off relay. This arrangement allows the voltmeter to measure the voltage across the auxiliary battery and the on/off relay to automatically turn off the system when the auxiliary battery reaches a certain voltage. The voltmeter continuously detects a current voltage of the auxiliary battery when the electrical connection is in the closed state. In more detail, the current voltage is a live voltage reading of the auxiliary battery. The on/off relay toggles the electrical connection from the closed state to the open state if the current voltage of the auxiliary battery is greater than or equal to the shutdown voltage threshold. This allows the auxiliary battery to be charged to a desired voltage. With reference to FIG. 16, the shutdown voltage threshold can be manually entered by the user. The user controller prompts to enter the shutdown voltage threshold. In more detail, the user is provided the option to enter the shutdown voltage threshold. Then, the shutdown voltage threshold is relayed from the user controller to the on/off relay if the shutdown voltage threshold is entered with the user controller. Thus, the user can manually input the shutdown voltage threshold.

Figure 17:
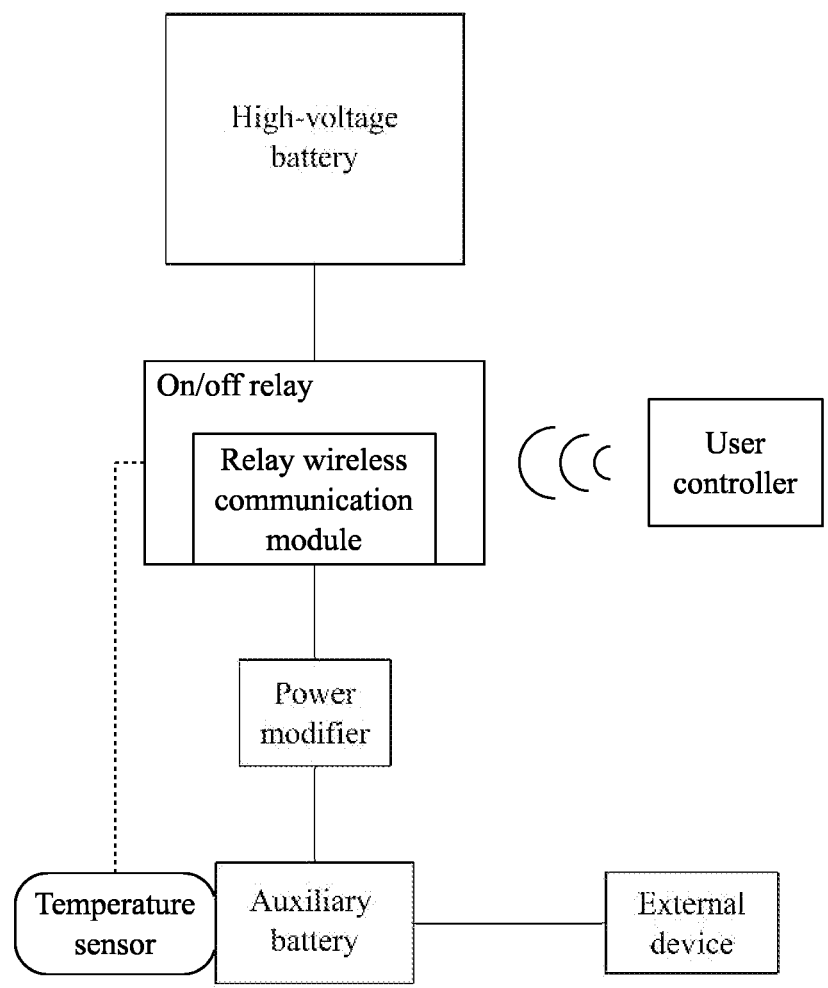
FIG. 17 is a block diagram illustrating another embodiment of the system with the temperature sensor in thermal communication with the auxiliary battery and communicably coupled to the on/off relay.
Figure 18:
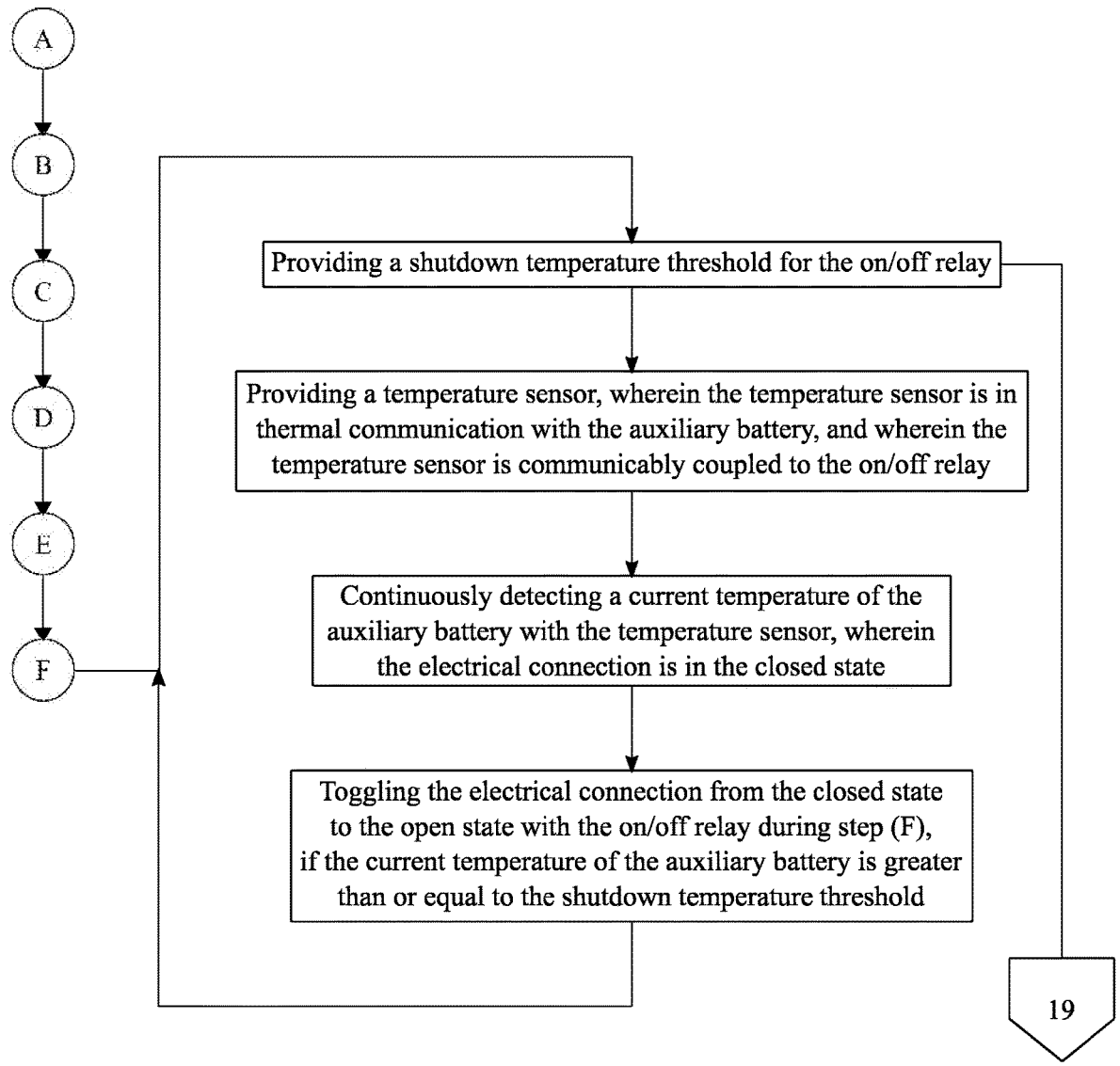
FIG. 18 is a flowchart illustrating the subprocess of using the temperature sensor and the on/off relay to turn the system off when the auxiliary battery reaches a certain temperature.
Figure 19:
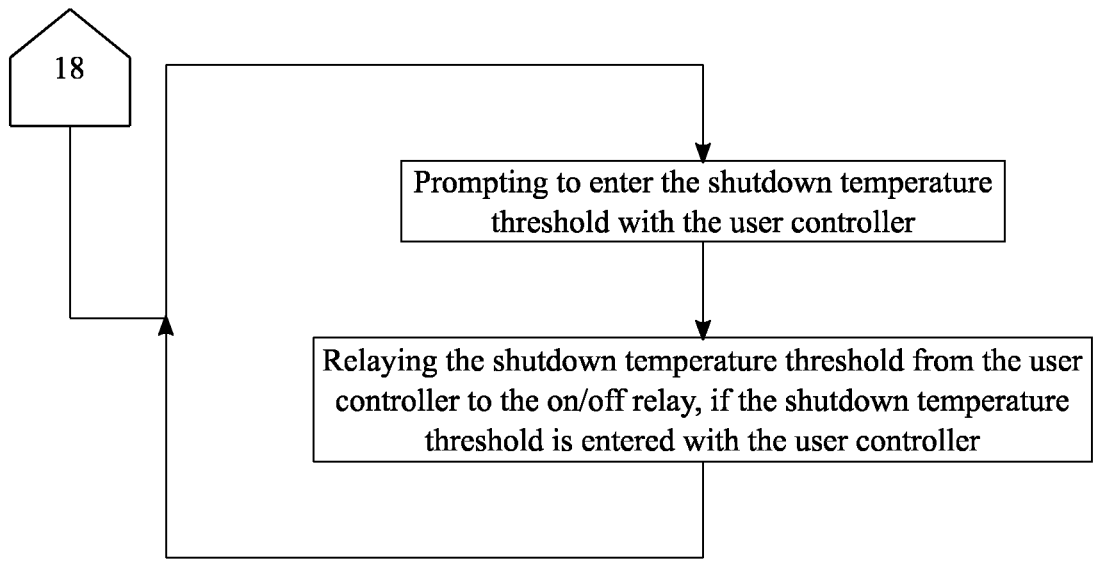
FIG. 19 is a flowchart illustrating the subprocess of manually inputting the shutdown temperature threshold with the user controller.

With reference to FIGS. 17 and 18, the system may be further provided with a temperature sensor that is in thermal communication with the auxiliary battery. Additionally, a shutdown temperature threshold is stored on the on/off relay and the temperature sensor is communicably coupled to the on/off relay. This arrangement allows the temperature sensor to measure the temperature of the auxiliary battery and the on/off relay to automatically turn off the system when the auxiliary battery reaches a certain temperature. The temperature sensor continuously detects a current temperature of the auxiliary battery when the electrical connection is in the closed state. In more detail, the current temperature is a live temperature reading of the auxiliary battery. The on/off relay toggles the electrical connection from the closed state to the open state if the current temperature of the auxiliary battery is greater than or equal to the shutdown temperature threshold. This allows the auxiliary to be safely charged. With reference to FIG. 19, the shutdown temperature threshold can be manually entered by the user. The user controller prompts to enter the shutdown temperature threshold. In more detail, the user is provided the option to enter the shutdown temperature threshold. Then, the shutdown temperature threshold is relayed from the user controller to the on/off relay if the shutdown temperature threshold is entered with the user controller. Thus, the user can manually input the shutdown temperature threshold.

Figure 20:
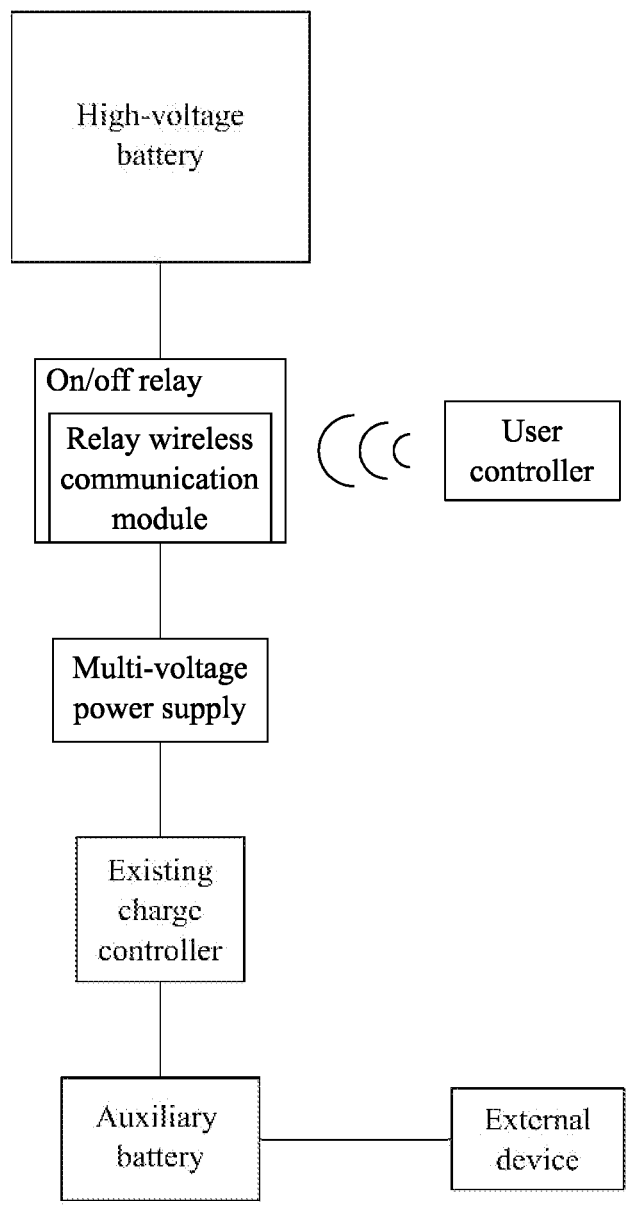
FIG. 20 is a block diagram illustrating another embodiment of the system with the multi-voltage power supply as the power modifier.
Figure 21:
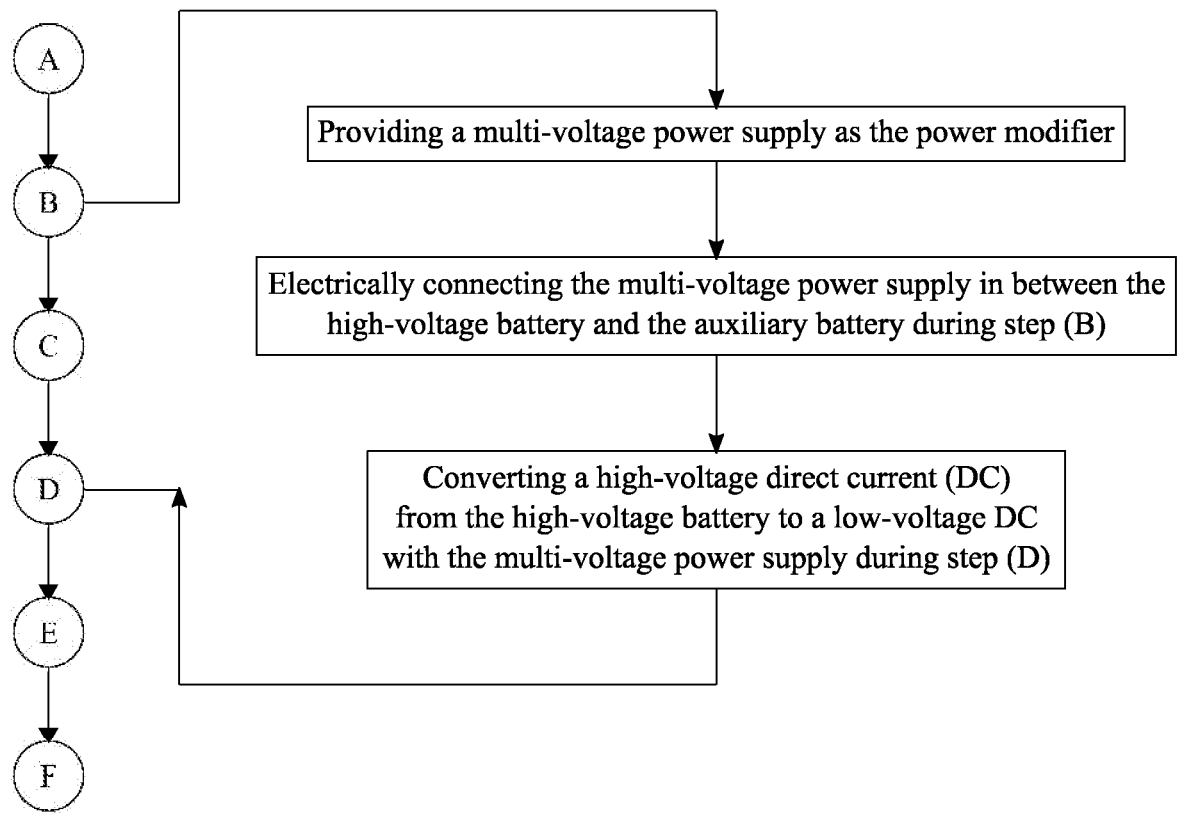
FIG. 21 is a flowchart illustrating the subprocess of charging the auxiliary battery using the multi-voltage power supply as the power modifier.

In another embodiment and with reference to FIGS. 20 and 21, the system is provided with a multi-voltage power supply as the power modifier. The multi-voltage power supply effectively reduces the high-voltage that is outputted by high-voltage battery so the system can be integrated with an existing off-grid system that includes existing lower rate charge controller. The multi-voltage power supply is electrically connected in between the high-voltage battery and the auxiliary battery. This allows the multi-voltage power supply to convert the DC drawn from the high-voltage battery before being used to charge the auxiliary battery. The multi-voltage power supply is used to convert a high-voltage DC from the high-voltage battery to a low-voltage DC during Step D. Thus, the DC from the high-voltage battery is safe for charging the auxiliary battery. Alternatively, a Buck converter may be used to deliver high-voltage vehicular power to an existing lower voltage standard type charge controller made for 12-, 24-, or 48-volt systems and 100 open circuit voltage (VOC) or to lower amperage power sources.

Figure 22:
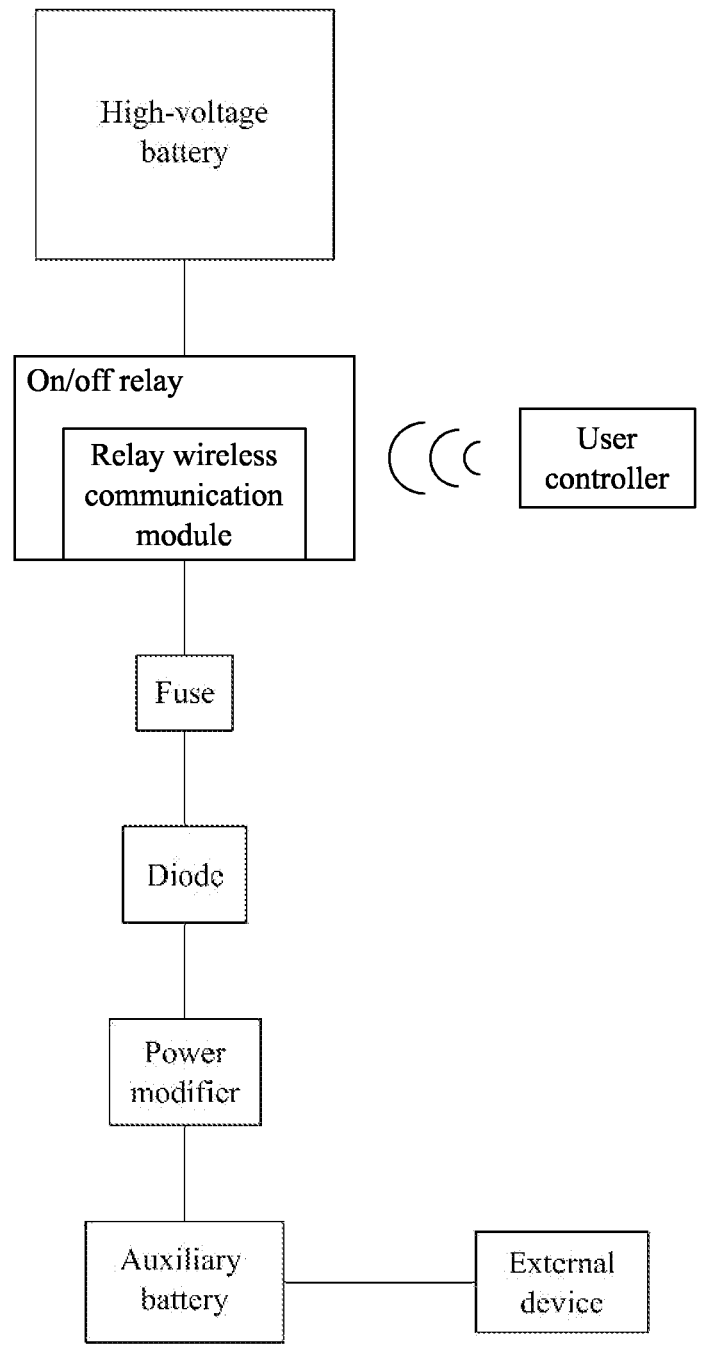
FIG. 22 is a block diagram illustrating another embodiment of the system with a fuse and a diode.

With reference to FIG. 22, the system may be further provided with a fuse and a diode. The fuse protects the system from an overcurrent exchange. The diode is used to allow only one-way electricity flow throughout the system. The fuse and the diode are electrically connected in between the high-voltage battery and the auxiliary battery. Thus, the fuse can protect the system from too much current flowing through the system and the diode can establish a one-way electricity flow throughout the system.

In another embodiment of the present invention, the auxiliary battery may be removed from the system and an external device can powered by the high-voltage battery using the power modifier. In this case, the power modifier may be the combination of a charge controller and a current inverter. In more detail, in this embodiment, there is no need to store the electrical energy inside the auxiliary battery and the electrical energy can be transferred from the high-voltage battery to external device through the power modifier.

Although the invention has been explained in relation to its preferred embodiment, it is to be understood that many other possible modifications and variations can be made without departing from the spirit and scope of the invention as hereinafter claimed.

What is claimed is:

1. A method of powering an external device with a vehicular battery system, the method comprises the steps of:
 (A) providing an electrically-driven vehicle, wherein the electrically-driven vehicle comprises at least one high-voltage battery;
 (B) providing a power modifier, an auxiliary battery, at least one external device, at least one on/off relay, a relay wireless communication module, and a user controller, wherein the user controller is communicably coupled to the on/off relay through the relay wireless communication module, and wherein an electrical connection is formed in series from the high-voltage battery, through the on/off relay, through the power modifier, and to the auxiliary battery;
 (C) electrically connecting the external device to the auxiliary battery;
 (D) electrically charging the auxiliary battery with the high-voltage battery;
 (E) electrically powering the external device with the auxiliary battery; and
 (F) toggling the electrical connection between an open state and a closed state with the on/off relay;
 providing a quick-disconnect device; and
 electrically connecting the power modifier to the auxiliary battery through the quick-disconnect device during step (B).

2. The method of powering an external device with a vehicular battery system, as claimed in claim 1, comprises the steps of:
 providing a charge controller as the power modifier;
 electrically connecting the charge controller in between the high-voltage battery and the auxiliary battery during step (B);
 converting a high-voltage direct current (DC) from the high-voltage battery to a low-voltage DC with the charge controller; and
 supplying the low-voltage DC to the auxiliary battery with the charge controller during step (D).

3. The method of powering an external device with a vehicular battery system, as claimed in claim 2, comprises the steps of:
 providing an optimal voltage value of the auxiliary battery;
 measuring an actual voltage value of the low-voltage DC with the charge controller;
 modifying the low-voltage DC from the actual voltage value into the optimal voltage value with the charge controller; and
 supplying the low-voltage DC at the optimal voltage value to the auxiliary battery with the charge controller during step (D).

4. The method of powering an external device with a vehicular battery system, as claimed in claim 2, comprises the steps of:
 providing a current inverter;
 electrically connecting the current inverter in between the auxiliary battery and the external device during step (B); and
 inverting the low-voltage DC to alternating current (AC) with the current inverter during step (E).

5. The method of powering an external device with a vehicular battery system, as claimed in claim 1, comprises the steps of:
 providing a programmable charger as the power modifier;
 electrically connecting the programmable charger in between the high-voltage battery and the auxiliary battery during step (B); and
 converting a high-voltage DC from the high-voltage battery to a low-voltage DC with the programmable charger during step (D).

6. The method of powering an external device with a vehicular battery system, as claimed in claim 1, comprises the steps of:
prompting to select the open state with the user controller during step (F), if the electrical connection is in the closed state;
relaying a selection of the open state from the user controller to the on/off relay during step (F), if the open state is selected by the user controller; and
toggling the electrical connection from the closed state to the open state with the on/off relay during step (F), if the selection of the open state is relayed from the user controller to the on/off relay.

7. The method of powering an external device with a vehicular battery system, as claimed in claim 1, comprises the steps of:
prompting to select the closed state with the user controller during step (F), if the electrical connection is in the open state;
relaying a selection of the closed state from the user controller to the on/off relay during step (F), if the closed state is selected by the user controller; and
toggling the electrical connection from the open state to the closed state with the on/off relay during step (F), if the selection of the closed state is relayed from the user controller to the on/off relay.

8. The method of powering an external device with a vehicular battery system, as claimed in claim 1, comprises the steps of:
providing the user controller as a user personal computing (PC) device, wherein the user PC device includes a device wireless communication module, wherein the user PC device is communicably coupled to the on/off relay through both the device wireless communication module and the relay wireless communication module;
prompting to enter a toggle command with the user PC device;
relaying the toggle command from the user PC device to the on/off relay, if the toggle command is entered by the user PC device; and
executing the toggle command with the on/off relay during step (F).

9. The method of powering an external device with a vehicular battery system, as claimed in claim 1, comprises the steps of:
providing a shutdown voltage threshold for the on/off relay;
providing a voltmeter, wherein the voltmeter is electrically connected across the auxiliary battery, and wherein the voltmeter is communicably coupled to the on/off relay;
continuously detecting a current voltage of the auxiliary battery with the voltmeter, wherein the electrical connection is in the closed state; and
toggling the electrical connection from the closed state to the open state with the on/off relay during step (F), if the current voltage of the auxiliary battery is greater than or equal to the shutdown voltage threshold.

10. The method of powering an external device with a vehicular battery system, as claimed in claim 9, comprises the steps of:
prompting to enter the shutdown voltage threshold with the user controller; and
relaying the shutdown voltage threshold from the user controller to the on/off relay, if the shutdown voltage threshold is entered with the user controller.

11. The method of powering an external device with a vehicular battery system, as claimed in claim 1, comprises the steps of:
providing a shutdown temperature threshold for the on/off relay;
providing a temperature sensor, wherein the temperature sensor is thermal communication with the auxiliary battery, and wherein the temperature sensor is communicably coupled to the on/off relay;
continuously detecting a current temperature of the auxiliary battery with the temperature sensor, wherein the electrical connection is in the closed state; and
toggling the electrical connection from the closed state to the open state with the on/off relay during step (F), if the current temperature of the auxiliary battery is greater than or equal to the shutdown temperature threshold.

12. The method of powering an external device with a vehicular battery system, as claimed in claim 11, comprises the steps of:
prompting to enter the shutdown temperature threshold with the user controller; and
relaying the shutdown temperature threshold from the user controller to the on/off relay, if the shutdown temperature threshold is entered with the user controller.

13. The method of powering an external device with a vehicular battery system, as claimed in claim 1, comprises the steps of:
providing a multi-voltage power supply as the power modifier;
electrically connecting the multi-voltage power supply in between the high-voltage battery and the auxiliary battery during step (B); and
converting a high-voltage DC from the high-voltage battery to a low-voltage DC with the multi-voltage power supply during step (D).

* * * * *